United States Patent [19]
Craig

[11] Patent Number: 6,019,314
[45] Date of Patent: Feb. 1, 2000

[54] AIRCRAFT HANDLING APPARATUS

[75] Inventor: Thomas Moodie Craig, Loanhead, United Kingdom

[73] Assignee: Mactaggart Scott (Holdings) Ltd., Loanhead, United Kingdom

[21] Appl. No.: 08/743,774

[22] Filed: Nov. 7, 1996

[30] Foreign Application Priority Data

Nov. 7, 1995 [GB] United Kingdom ............... 9522703

[51] Int. Cl.[7] .................. B64F 1/22; B63B 35/50
[52] U.S. Cl. ..................... 244/115; 244/116; 114/261
[58] Field of Search ......................... 244/115, 116, 244/114 R; 114/261, 262

[56] References Cited

U.S. PATENT DOCUMENTS

| | | | |
|---|---|---|---|
| 3,291,422 | 12/1966 | Van Valkenburg | 244/114 |
| 3,640,490 | 2/1972 | Baekken | 244/116 |
| 3,659,813 | 5/1972 | Mesnet et al. | 244/116 |
| 3,790,111 | 2/1974 | Mesnet et al. | 244/116 |
| 3,830,452 | 8/1974 | Seay | 244/116 |
| 4,123,020 | 10/1978 | Korsak | 244/116 |
| 4,319,722 | 3/1982 | Pesando | 244/116 |
| 4,397,254 | 8/1983 | Deady | 244/116 |
| 4,420,132 | 12/1983 | Martin | 244/115 |
| 4,473,200 | 9/1984 | Deady | 244/116 |
| 4,529,152 | 7/1985 | Bernard | |
| 4,558,790 | 12/1985 | Bruce-Walker | 244/115 |
| 4,786,014 | 11/1988 | Pesando et al. | 244/115 |
| 4,787,574 | 11/1988 | Craig | 244/116 |
| 5,102,091 | 4/1992 | Craig | 244/116 |
| 5,248,115 | 9/1993 | Aurelio | 244/115 |
| 5,347,947 | 9/1994 | Craig | 244/115 |
| 5,664,743 | 9/1997 | Ortelli | 244/115 |

FOREIGN PATENT DOCUMENTS

| | | |
|---|---|---|
| 0 103 519 | 3/1984 | European Pat. Off. . |
| 0 208 439 | 1/1987 | European Pat. Off. . |
| 0 449 702 A1 | 10/1991 | European Pat. Off. . |
| 598 590 | 12/1925 | France . |
| 28 02 231 A1 | 7/1978 | Germany . |
| 1 556 892 | 11/1979 | United Kingdom . |
| 2 075 931 | 11/1981 | United Kingdom . |
| WO 93/17910 | 9/1993 | WIPO . |

*Primary Examiner*—Virna Lissi Mojica
*Attorney, Agent, or Firm*—Pennie & Edmonds LLP

[57] ABSTRACT

Apparatus is disclosed for moving an aircraft across a deck surface from a landing position to a stowed position. The apparatus comprises a pair of control beams (26, 28). The control beams are propelled along longitudinal (6, 8) and transverse rails (22, 24) to engage and then position a landed aircraft ready for the aircraft to be guided securely to its hangar by a self-propelled shuttle unit (58). When not in use, the control beams may be stored in the hangar.

25 Claims, 7 Drawing Sheets

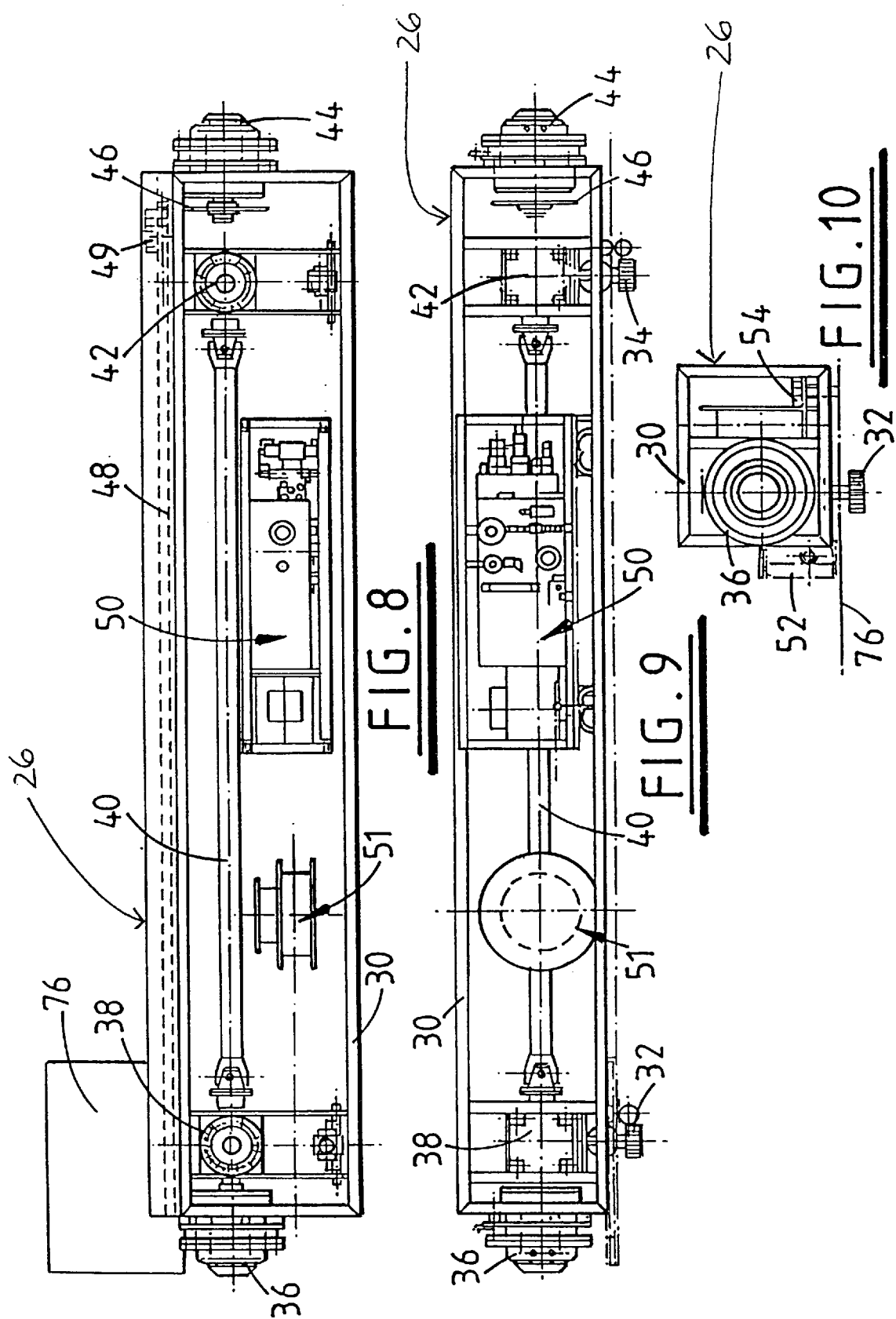

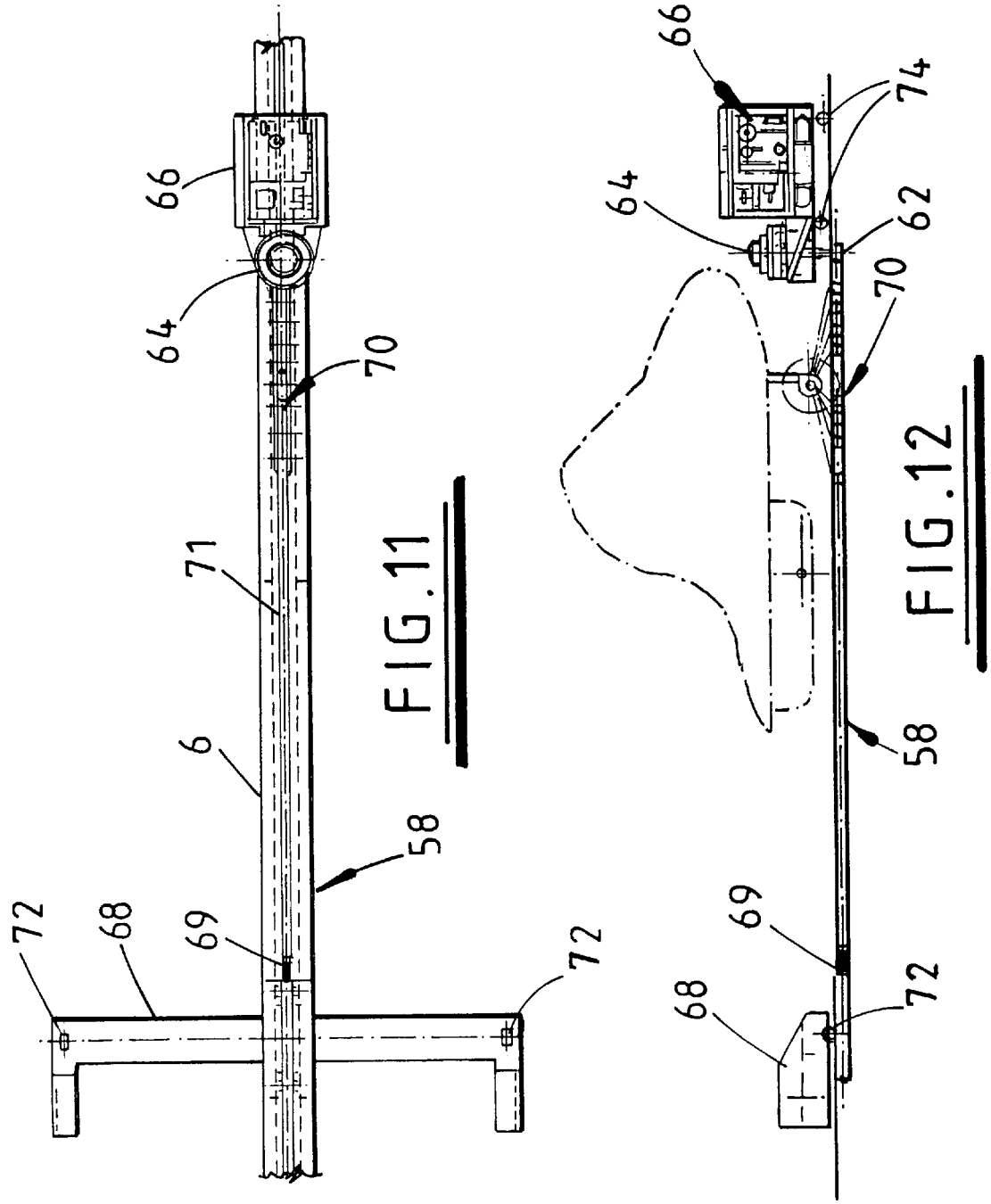

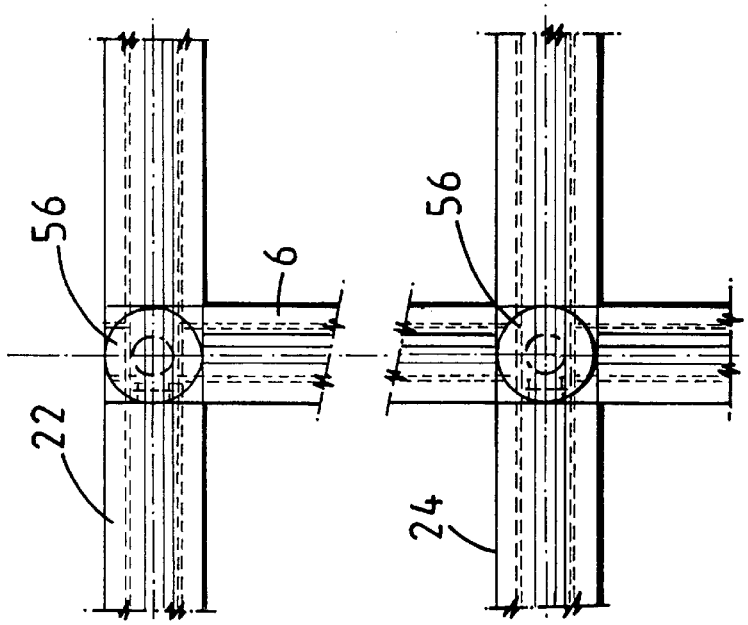
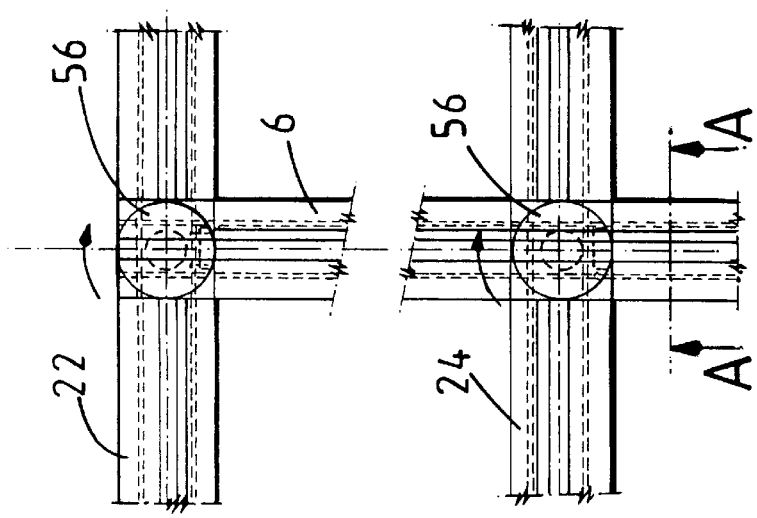
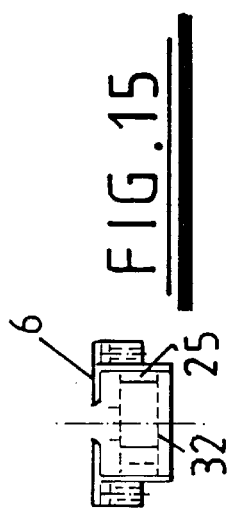

AIRCRAFT HANDLING APPARATUS

FIELD OF THE INVENTION

The present invention relates to apparatus for handling aircraft on ships or the like. The apparatus is particularly suitable for use with helicopters and is applicable also to the handling of weapons for use by such aircraft.

BACKGROUND OF THE INVENTION

The landing of helicopters on board ships requires handling means to move such aircraft between a landing area on the deck of a ship and a storage area or hangar. Generally, aircraft will land in the landing area but their orientation with respect to the entrance to the hangar is variable and cannot be predicted. It is necessary therefore to align the helicopter with the hangar entrance prior to moving the helicopter into the hangar. It will be appreciated that in adverse weather and/or sea conditions such movement of aircraft may be extremely hazardous and a handling system should be able to handle aircraft in a manner ensuring the safety of the helicopter and the ship's crew.

Existing systems utilise handling trucks or arrangements of pulleys, winches and cables on the landing deck of ships. Such systems, however, are undesirable because the presence of apparatus above the deck surface creates potentially dangerous obstacles to landing aircraft and the ship's crew. European Patent Application 518405 (Riva Calzoni S.p.A) relates to a device for gripping, handling and transporting helicopters on board ships. The document discloses the use of longitudinal and transverse guide rails and gripping beams which are stored on deck and run along the transverse guides to engage the helicopter. In order to effect transverse movement of an aircraft, the aircraft has to be lifted from the deck. Such a lifting arrangement imposes undesirable strain on the support mechanism and can affect the stability of the aircraft. U.S. Pat. No. 5,570,858 to Craig, the disclosure of which is incorporated herein by reference, describes an aircraft restraining system for securing and handling an aircraft on the deck of a ship. The system includes two restraining beams which are transversely movable for engaging the aircraft. When not in use, the beams lie in recesses in the surface of the deck and thus they are constantly exposed to sea-water and the like. Exposure of the beams to such conditions increases their susceptibility to corrosion and increases maintenance requirements.

It is an object of the present invention to avoid or minimize one or more of the foregoing disadvantages.

SUMMARY OF THE INVENTION

According to the present invention there is provided aircraft handling apparatus for moving an aircraft across a deck surface from a landing position to a stowed position, said apparatus comprising longitudinal and transverse guides along which first and second control elements are movable from a stowed position to an aircraft engaging position, said control elements being further operable to secure an engaged aircraft to permit the aircraft to be guided securely to its stowed position.

Preferably, the control elements are beams and the beams are transversely movable into securing engagement with a respective side of an aircraft. This prevents the aircraft from rotating undesirably about its axis and eliminates the risks of imbalance and tilting. Each beam may further comprise latching means for effecting releasable engagement with a respective side of the aircraft, at least one of said latching means being slidable relative to its beam, to effect pivotal movement of the aircraft about a vertical axis.

The apparatus may be provided with transversely slidable means for receiving wheels of the aircraft and allowing said wheels to be moved transversely on transverse movement of first and second control beams. Preferably also, each transverse slide means is in the form of a plate carried by and projecting laterally of each beam, the plate being in sliding contact with the deck surface.

Advantageously, the transverse guides and the longitudinal guides are in the form of rails. Preferably, the longitudinal rails intersect the transverse rails. Most preferably, each rail has a gear rack extending along its interior for co-operation with a drive pinion projecting from the beam. Rotation of the pinion causes the beam to move along the rail.

Conveniently, there is provided a transfer mechanism in the form of a rack transfer unit for transferring the control beams between the longitudinal and transverse guides. Most conveniently, a transfer mechanism is located at each intersection between the transverse and longitudinal rails.

BRIEF DESCRIPTION OF DRAWINGS

Embodiments of the present invention will now be described, by way of example, with reference to the accompanying drawings in which:

FIG. 8 is a schematic plan view of a beam constituting a component of the aircraft handling apparatus of FIGS. 1 to 7;

FIG. 9 is a schematic side view of the beam of FIG. 8;

FIG. 10 is a schematic end view of the beam of FIG. 8;

FIG. 11 is a schematic plan view of a shuttle assembly constituting a component of the aircraft handling apparatus of FIGS. 1 to 7;

FIG. 12 is a schematic side view of the shuttle of FIG. 11;

FIGS. 13 and 14 are diagrammatic illustrations of the mechanism whereby drive pinions of the beam of FIGS. 8 to 10 are transferred from a longitudinal drive rail to a pair of transverse drive rails;

FIG. 15 is a cross-sectional diagrammatic view on the line A—A of FIG. 13 showing a drive pinion in co-operation with its gear rack.

DETAILED DESCRIPTION OF PREFERRED EMBODIMENTS

Figure 1:
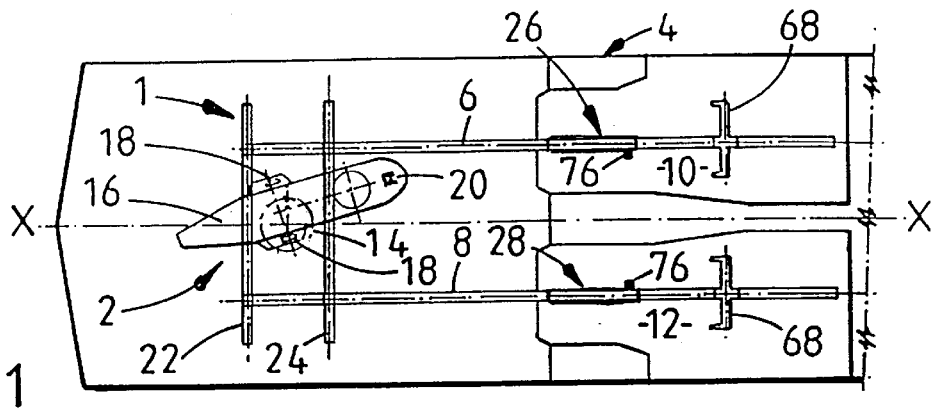
FIGS. 1 to 7 are sequential schematic plan views of an aircraft handling apparatus for moving a helicopter across the deck of a ship from a landing position to a hangar for stowage.

Referring to FIGS. 1 to 7 of the drawings, aircraft handling apparatus generally indicated by reference numeral 1 is disposed for use on the deck 2 of a ship 4. The apparatus comprises two longitudinal, parallel, spaced-apart guide rails 6, 8 located parallel to the longitudinal axis X—X (FIG. 1) of the ship 4. Each rail 6 and 8 extends from a respective hangar 10, 12 to adjacent an aircraft landing area incorporating a landing grid 14 of known construction and on which a helicopter 16 may land and be secured thereto by a deck lock (not shown but also of known construction). The helicopter 16 has a pair of main wheels 18 and a nose wheel 20. A second pair of transverse, spaced-apart parallel guide rails 22, 24 extend across the aircraft landing area on either side of the landing grid 14 and intersect at right angles the longitudinal rails 6, 8. Each of the longitudinal and transverse rails 6, 8, 22 and 24 defines an inverted T-shaped channel which houses a gear rack extending the length of each rail. The rails are bedded into the deck 2 so that they do not project above the deck surface. Thus the surface is maintained free from obstruction.

The rails 6, 8, 22, 24 are provided with a pair of elongated control beams 26, 28 which, as shown in FIG. 1, are located on the longitudinal rails 6, 8. Each beam comprises a channel section body 30 as shown in FIGS. 8 to 10. Two drive pinions 32, 34 are mounted within the channel 30 as shown in FIG. 9 and these project from the underside of the beam to engage the gear rack in the interior of each of the rails 6, 8, 22, 24. On rotation of the drive pinions 32, 34 the beams are driven along the rails The distance between the pinions 32 and 34 is the same as the distance between the gear racks on each of the parallel transverse rails 22, 24. One of the advantages of using a rack and pinion drive as described above is that the beams can be propelled along the rails smoothly and precisely, without problems regarding rope stretch, chain wear or the like. Further, the arrangement allows the position of a beam with respect to its rail to be determined via an encoder. Each beam 26, 28 is provided with an hydraulic motor 36 which drives the pinion 32 through the intermediary of a right-angled bevel gear box 38 and also pinion 34 via a synchronising shaft 40 and right-angled bevel gear box 42. A second hydraulic motor 44 is mounted at the other end of each beam from the hydraulic drive motor 36. The hydraulic motor 44 drives a sprocket 46, which through a connecting drive chain (not shown), rotates an elongated latching screw 48 mounted on the inboard face of each beam in order to enable an aircraft wheel latching mechanism 49 in screw-threaded engagement with screw 48 to be moved along the beam. The latching mechanism 49 is not described in detail but is of a well-known spring-loaded type which is customarily used for engagement with aircraft wheels in known manner.

Each latching mechanism 49 is resiliently mounted on the respective beam 26, 28, in this example by provision of springs between the ends of the latching screw 48 and the beam. This arrangement serves to reduce the transverse loads transferred to the beam from the aircraft; if, for example, the deck tilts, an unrestrained aircraft will move by deformation of the aircraft's tires, even though the tire "footprints" do not move relative to the deck. With this spring loaded arrangement the transverse loads produced by such movement are shared between the springs and the aircraft's tires.

Hydraulic fluid is supplied to the hydraulic motors 36 and 44 by a pumping set 50. The pumping set is operated by an electric motor supplied with electrical power by an electric cable stored on a self-reeling cable drum 51. A control cable connects the self-propelled unit to the control console.

Each beam 26, 28 is also provided with support rollers 52 which run on the upper surface of the rails with further rollers 54 running on the inside of the rail to accommodate athwartships loading from an aircraft.

At the junction of each longitudinal rail 6, 8 and the transverse rails 22, 24 there is provided a direction transfer mechanism 56 (FIGS. 13 and 14) in the form of a rack transfer unit. When a beam 26 or 28 is moved fully aft away from its respective hangar, the transfer mechanism 56 is engaged by the beam drive pinions 32, 34, and rotated through 90°. This disengages the pinions 32, 34 from the gear rack 25 of its associated longitudinal rail and moves the pinions into engagement with the gear rack on each of the transverse rails 22, 24. The mechanism can also be operated in the reverse direction to disengage the pinions 32, 34 from the racks of the transverse rails and engage them with the co-operating racks of the longitudinal rails.

Also mounted for movement along each longitudinal rail 6, 8 is a shuttle unit (FIGS. 11 and 12) which includes a shuttle 58 connected to a drive unit 60. The unit 60 incorporates a drive pinion 62 (FIG. 12) which projects downwardly to engage the internal gear rack of its associated rail 6, 8. The pinion 62 is driven by a hydraulic motor 64 supplied with hydraulic fluid from a pumping set 66. The shuttle unit can thus be self-propelled along its associated longitudinal rail. The shuttle 58 has a main wheel restraint bracket 68 spring-loaded by means of a spring 69 and connected to a nose wheel restraint member 70 through a connecting rod 71. The shuttle 58 and drive unit 60 are movable over the deck 2 on rollers 72 and 74 respectively.

Secured to each of the beams 26, 28 is a plate 76 (FIGS. 8 and 10) adapted to receive a main wheel 18 of the aircraft to enable the main wheels 18 to be moved laterally over the deck 2 on transverse movement of the beams 26, 28 when engaged with an aircraft. The plate 76 extends in close sliding contact with the deck of the ship so that lifting of the aircraft in order to effect transverse movement of the aircraft wheels is unnecessary.

Operation of the apparatus as set out above will now be described with particular reference to FIGS. 1 to 7.

In the position shown in FIG. 1 the helicopter 16 has landed on the deck 2 of the ship and is secured to the landing grid 14 by a deck lock (not shown) in customary fashion. When the helicopter lands, the deck 2 is completely clear of all obstruction and the beams 26, 28 are stored in their respective hangars 10, 12 together with the shuttle units. The nose wheel of the helicopter is disposed in a fore and aft position.

Figure 2:
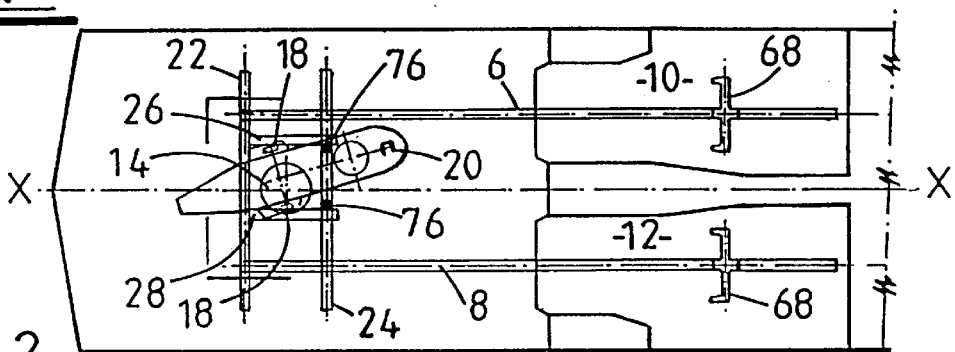

In FIG. 2, the beams 26, 28 have been moved aft from their hangars along their respective longitudinal rails 6 and 8 until the drive pinions 32 and 34 reach their associated direction transfer mechanism 56. The mechanisms 56 have then been activated to disengage the drive pinions 32 and 34 from the gear racks on the longitudinal rails and engage the gear racks on the transverse rails 22, 24 and the beams 26, 28 moved inboard to abut spurs projecting inwardly from each main wheel 18 of the helicopter. The nose wheel 20 is rotated through 90°. The motors 44 are then operated to move the latching mechanism 49 of each beam 26, 28 into engagement with its associated main wheel spur. The aircraft is now secured against unwanted movement and the deck lock can be disengaged.

Figure 3:
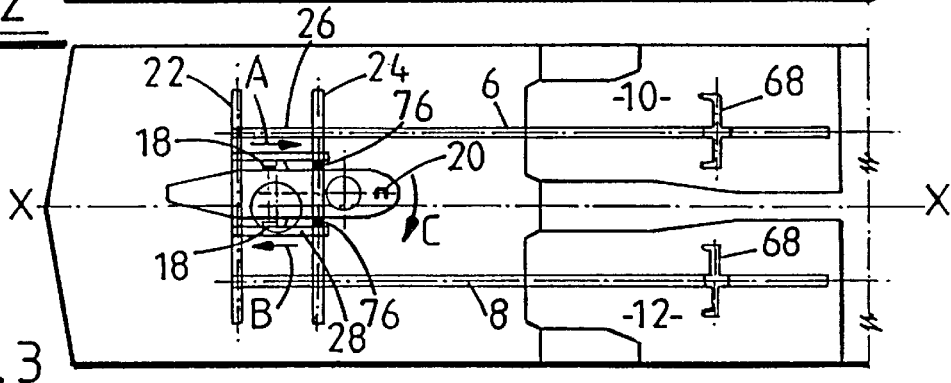

As shown in FIG. 3, the latching mechanisms 49 of each of the beams 26, 28 are then moved in opposing directions (arrows A and B) causing the helicopter 16 to be rotated in the direction of arrow C until the longitudinal axis of the aircraft 16 is parallel to the ship's centre line X—X. The nose wheel is moved into the fore and aft position.

Figure 4:
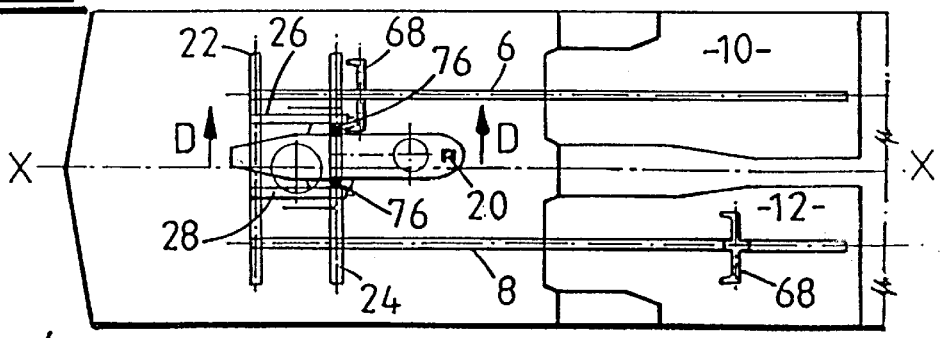

In the position of FIG. 4, the latching mechanism 49 of each beam 26, 28 is actuated to move the aircraft forward until the main wheels 18 rest on top of the transverse plate 76 extending from each of the beams 26, 28. The nose wheel is rotated through 90° and the shuttle unit is moved aft from its hangar 10 along longitudinal rail 6 to a predetermined stop.

Figure 5:
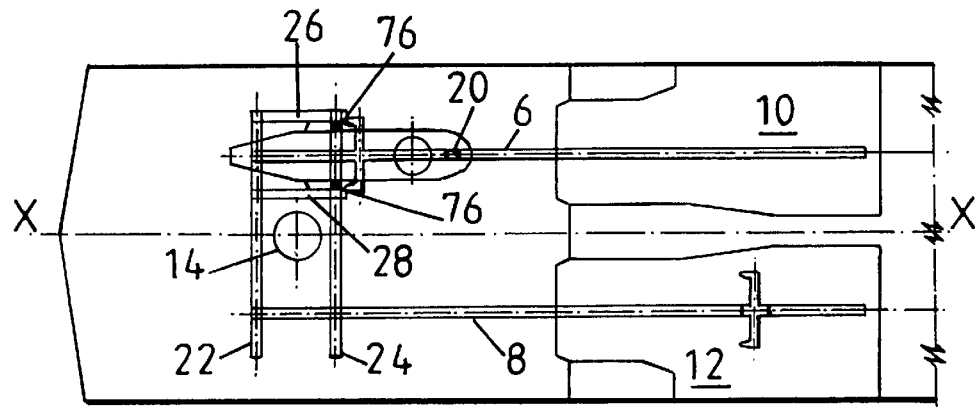

In FIG. 5, the beams 26, 28 have been moved athwartships along the transverse rails 22, 24 until the aircraft centre line is coincident with the centre line of longitudinal rail 6. The nose wheel 20 is again rotated through 90° into the fore and aft position.

Figure 6:
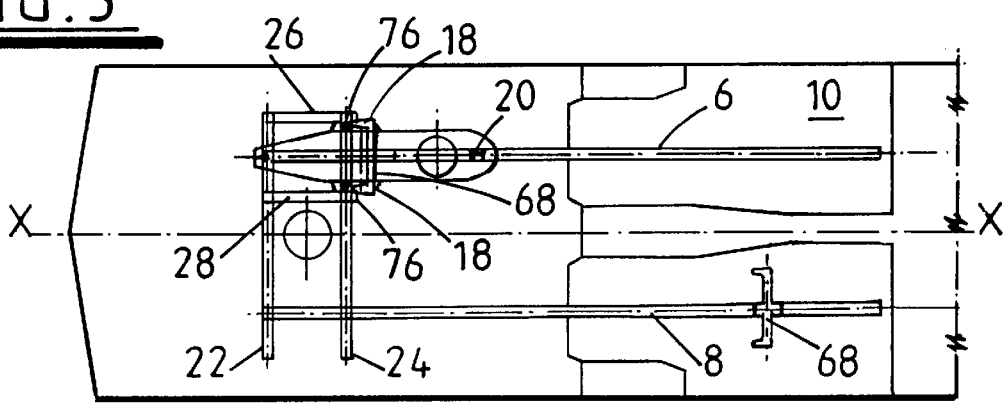

In the position of FIG. 6 the shuttle unit is moved aft a small distance where the wheel restraint brackets 68, which co-operate with the spurs, are brought into contact with the ends of beams 26, 28. Further displacement of the shuttle unit causes the main wheel restraint brackets 68 to press against the ends of the beams 26, 28. This causes the spring 69 to compress and automatically disengage the beam latching mechanism 49 from the spurs of the main wheels 18. The spurs can now pass freely from the beams 26, 28 to the wheel restraint brackets 68 of the shuttle unit and the aircraft 14 is now in a position to be moved forward along the rail 6. On actuation of the shuttle unit, the spurs transfer into the restraint brackets 68 and the compression spring 69 extends due to the forward movement of the nose wheel restraint member 70. The security of the aircraft is thus transferred from the beams 26, 28 to the shuttle unit. Engagement of the aircraft with the restraint bracket 68 restrains the spurs on the main wheels 18 of the aircraft against movement both athwartships outboard or vertically, the latter to prevent toppling of the aircraft.

Figure 7:
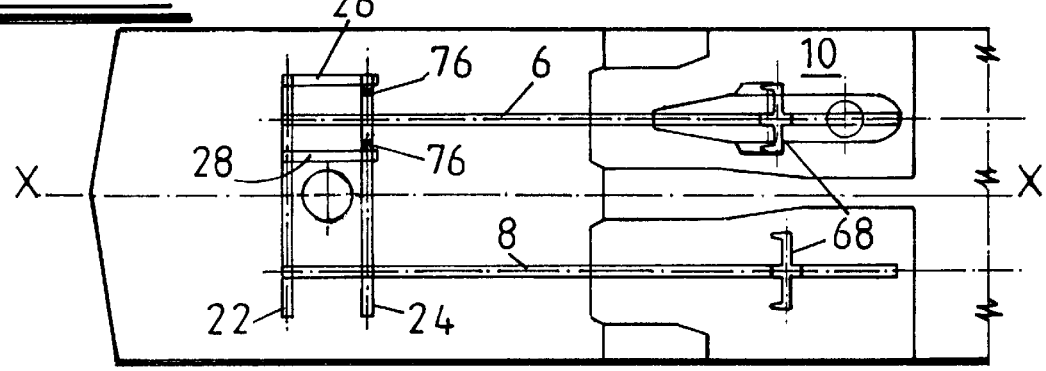

The final stage is shown in FIG. 7 where the aircraft is pulled into the hangar 10 whereupon the beams 26, 28 can be moved along their associated transverse rails 22, 24 and, via the direction transfer mechanisms 56, along their respective longitudinal rails 6, 8 into a stowed position in hangars 10 and 12.

Figure 17:
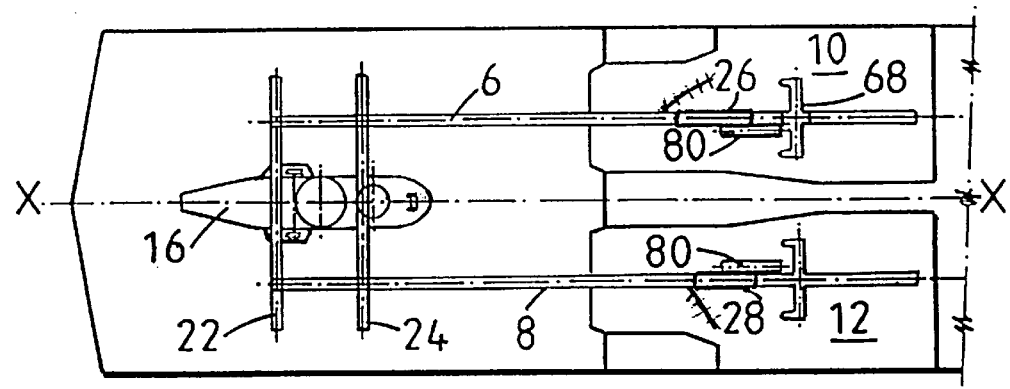
Figure 18:
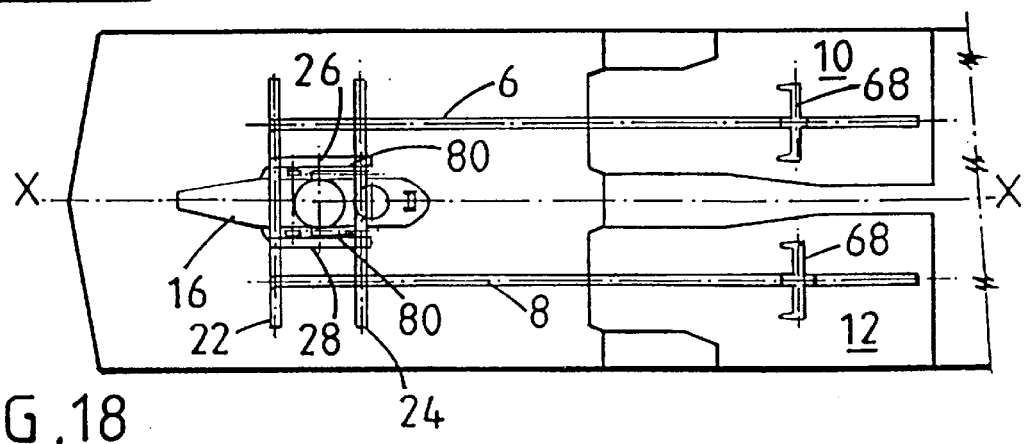

In a modification of the invention, the apparatus is used to transfer weapons between a hangar and the helicopter and is described with reference to FIGS. 16 to 18.

Figure 16:
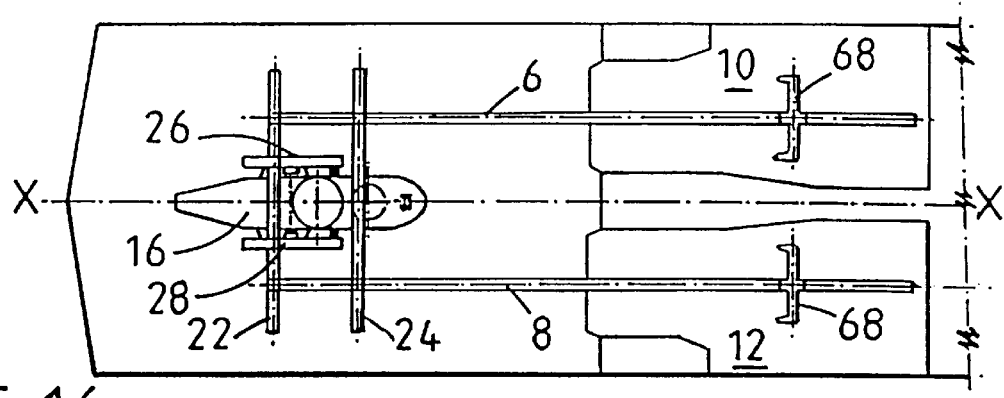
FIGS. 16 to 18 illustrate a modification of the invention for use in handling weapons to be carried by an aircraft.

As shown in FIG. 16, after an aircraft 16 has landed it is aligned by beams 26, 28 as previously described, to enable a deck lock to be engaged to the landing grid. The deck lock is secured and the beams 26, 28 are returned to their respective hangars 10 and 12. A weapon trolley 80 which houses a weapon is attached to each beam 26, 28 as shown in FIGS. 17 and 18. The degree of offset between the aircraft and the weapon is determined by the length of brackets between the weapon trolley and the beam. Similarly, the latching mechanism 49 of each beam 26, 28 can be operated to ensure that the weapons are in correct longitudinal alignment with the aircraft. The weapon can thus be placed directly under the aircraft weapon pylon (not shown) and therefrom conveniently hoisted onboard.

The beams 26, 28 move the weapon trolley 80 aft along rails 6 and 8 and then inboard along rails 22, 24 to the aircraft where each beam stops against a main wheel spur. The weapon is now correctly placed to allow crew to hoist it to the aircraft (see FIG. 18). The beams 26, 28 are then driven back to their hangars 10 and 12 and the deck lock released so that the aircraft may take off.

Various modifications may be made to the above described embodiment without departing from the scope of the present invention. For example, the invention can be utilised with aircraft other than helicopters and may be used on locations other than on board ship, such as on an oil platform or on land.

Figure 19:
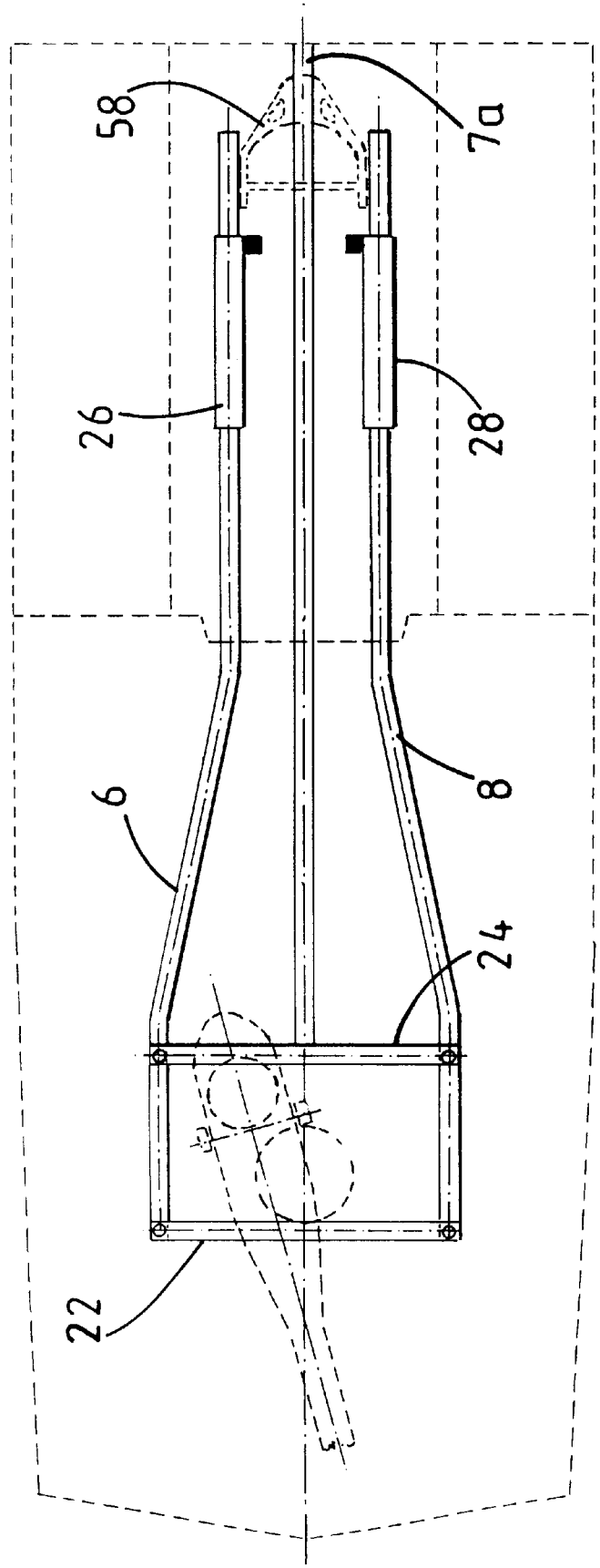
FIG. 19 is an embodiment of the invention in use with a single hangar.

The above described embodiments describe an arrangement in which two hangars are utilised with a longitudinal rail associated with each hangar. The invention can equally well be used with a single hangar as illustrated in FIG. 19. In this particular example, three longitudinal rails are used. The beams 26, 28 travel on the outboard rails 6, 8 which although non-intersecting, are not straight. The shuttle unit 58 travels on the straight central rail 7a.

I claim:

1. Apparatus for moving an aircraft across a deck surface from a landing position to a stowed position, the apparatus comprising:
    longitudinal guides and transverse guides for extending across a deck surface, each longitudinal guide intersecting with at least one transverse guide; and
    first and second control elements, each control element being movable along and engageable with both a longitudinal guide and a transverse guide, said control elements movable from a stored position to an aircraft engaging position, and said control elements being further operable to secure and position an engaged aircraft to permit the aircraft to be guided securely to its stowed position.

2. Apparatus of claim 1 wherein said control elements are beams, each beam being movable from said stored position into securing engagement with a respective side of an aircraft.

3. Apparatus of claim 2 wherein each control beam has a latching means for effecting releasable engagement with one side of the aircraft, at least one of said latching means being slidable relative to its beam, to effect pivotal movement of the aircraft about a vertical axis.

4. Apparatus of claim 3 wherein each latching means is resiliently mounted on its respective control beam.

5. Apparatus of claim 1 which further comprises transversely slidable means operatively associated with said control elements for receiving wheels of an aircraft to allow said wheels to be moved transversely on transverse movement of said first and second control elements.

6. Apparatus of claim 1 wherein the transverse guides and the longitudinal guides are rails.

7. Apparatus of claim 6 in combination with a deck defining a deck surface and wherein each rail is bedded into said deck so that the rails does not project above said deck surface.

8. Apparatus for moving an aircraft across a deck surface from a landing position to a stowed position, the apparatus comprising:
    longitudinal rails and transverse rails for extending across a deck surface, each longitudinal rail intersecting with at least one transverse rail;
    first and second control elements, each control element being movable along a longitudinal rail and transverse rail from a stored position to an aircraft engaging position, said control elements being further operable to secure and position an engaged aircraft to permit the aircraft to be guided securely to its stowed position; and
    a gear rack extending along the interior of each of the rails and each control element further comprises at least one drive pinion projecting from said control element for co-operation with said gear racks, whereby rotation of the pinion causes said control element to be driven along a rail.

9. Apparatus of claims 8 wherein each pinion is driven by a hydraulic drive motor.

10. Apparatus of claim 1 which further comprises a transfer unit which is rotatable for transferring the control elements between the longitudinal and transverse guides.

11. Apparatus of claim 8 which further comprises a rack transfer unit which is rotatable for transferring the control elements between the racks defined by the longitudinal and transverse guides.

12. Apparatus of claim 8 wherein each control element has two drive pinions projecting therefrom for co-operation with said gear racks.

13. Apparatus of claim 12 wherein the spacing between the pinions on each control element is the same as the spacing between the gear racks on each of the parallel transverse rails.

14. Apparatus of claim 12 wherein rotation of each pinion is synchronised.

15. Apparatus of any claim 1 further comprising a shuttle unit for engaging an aircraft positioned on the deck with the centre line of said aircraft coincident with the centre line of a longitudinal guide, said shuttle unit being operable to move the aircraft along said longitudinal guide to its stowed position.

16. Apparatus of claim 15 wherein a gear rack extends along the interior of the longitudinal guide along which said shuttle unit travels and wherein said shuttle unit comprises a shuttle connected to a drive unit incorporating at least one pinion for co-operation with said gear rack, said drive unit being operable to propel said shuttle along said longitudinal guide.

17. Apparatus of claim 16 wherein said shuttle unit further includes transfer means for transferring secure engagement of the aircraft from said control elements to said shuttle unit.

18. Apparatus of any claim 1 wherein the control elements are movable along both longitudinal and transverse guides to transport a weapons trolley to an aircraft positioned on the deck.

19. Apparatus for moving an aircraft across a deck surface from a landing position to a stowed position spaced from the landing position, the apparatus comprising:

a deck defining a deck surface;

longitudinal guide rails and transverse guide rails extending across the deck surface and being bedded into the deck so that the rails do not project above the deck surface, each rail having a rack extending therealong, and each longitudinal guide rail intersecting with at least one transverse guide rail; and first and second control beams provided with driven pinions for engaging the racks of the guide rails and moving the control beams therealong; and transfer means at each intersection of a longitudinal guide rail with a transverse guide rail for transferring a control beams between the longitudinal guide rail and the transverse guide rail, whereby said control beams are movable from a stored position to a landing aircraft engaging position along said longitudinal and transverse guide rails.

20. Apparatus for moving an aircraft across a deck surface from a landing position to a stowed position, the apparatus comprising:

longitudinal guides and transverse guides for extending across a deck surface, each longitudinal guide intersecting with at least one transverse guide;

first and second control elements, each control element being movable along a longitudinal guide and transverse guide from a stored position to an aircraft engaging position, said control elements being further operable to secure and position an engaged aircraft to permit the aircraft to be guided securely to its stowed position; and a gear rack extending along the interior of each of the guides and at least one drive pinion projecting from each control element for co-operation with said gear racks, whereby rotation of the pinion causes said control element to be driven along a guide.

21. Apparatus of claims 20 wherein each pinion is driven by a hydraulic drive motor.

22. Apparatus of claim 20 which further comprises a rack transfer unit which is rotatable for transferring the control elements between the racks defined by the longitudinal and transverse guides.

23. Apparatus of claim 20 wherein each control element has two drive pinions projecting therefrom for co-operation with said gear racks.

24. Apparatus of claim 23 wherein the spacing between the pinions on each control element is the same as the spacing between the gear racks on each of the transverse guides.

25. Apparatus of claim 23 wherein rotation of each pinion is synchronized.

* * * * *